Feb. 25, 1969  J. R. THYGESON, SR  3,429,057
DRYERS
Filed Dec. 5, 1966
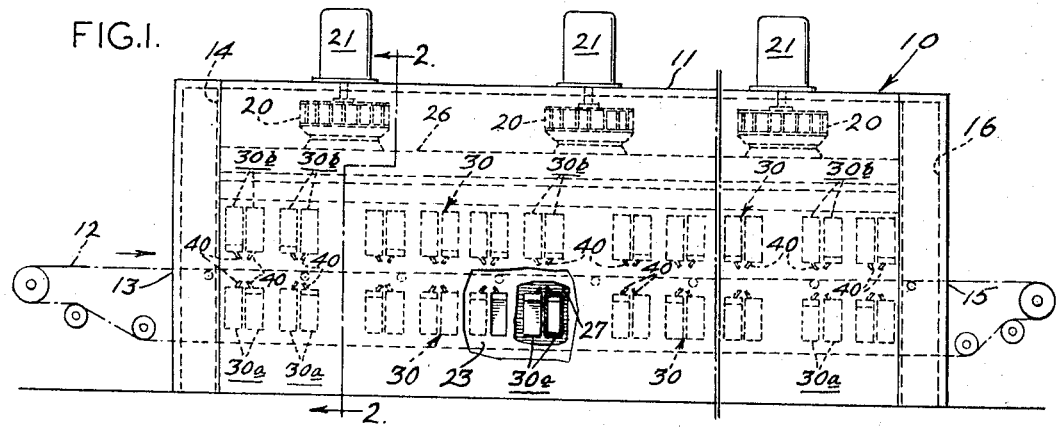
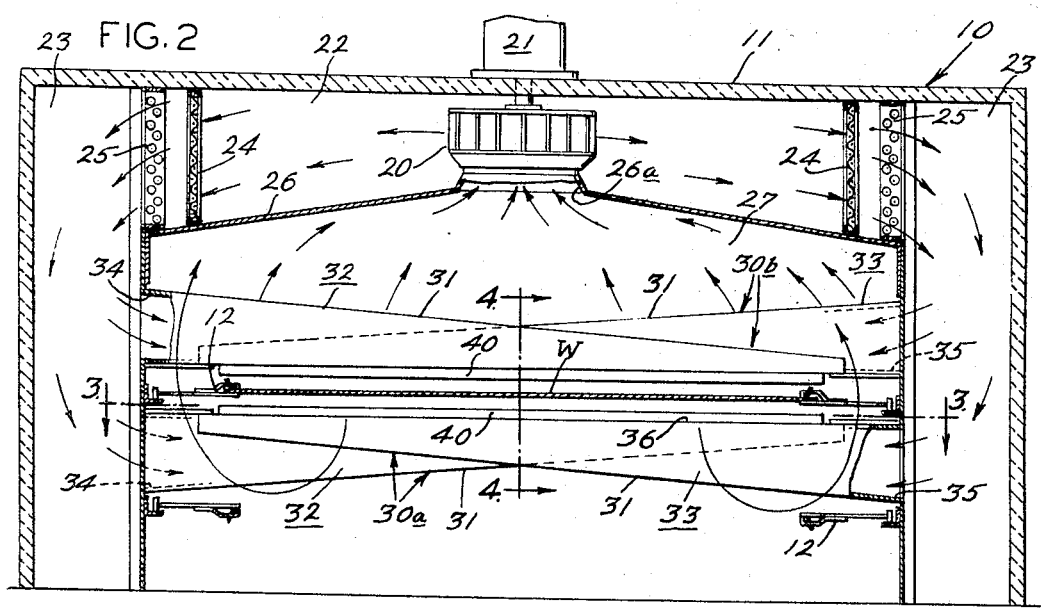
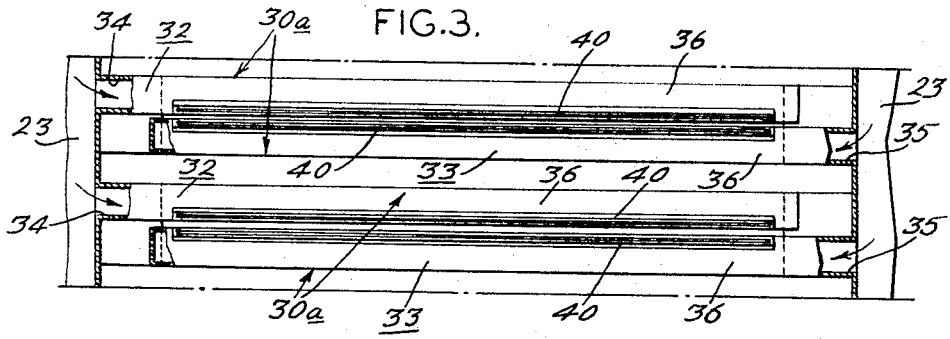
INVENTOR:
JOHN R. THYGESON, SR.
BY Howson & Howson
ATTYS.

INVENTOR:
JOHN R. THYGESON, SR.
BY Howson & Howson
ATTYS.

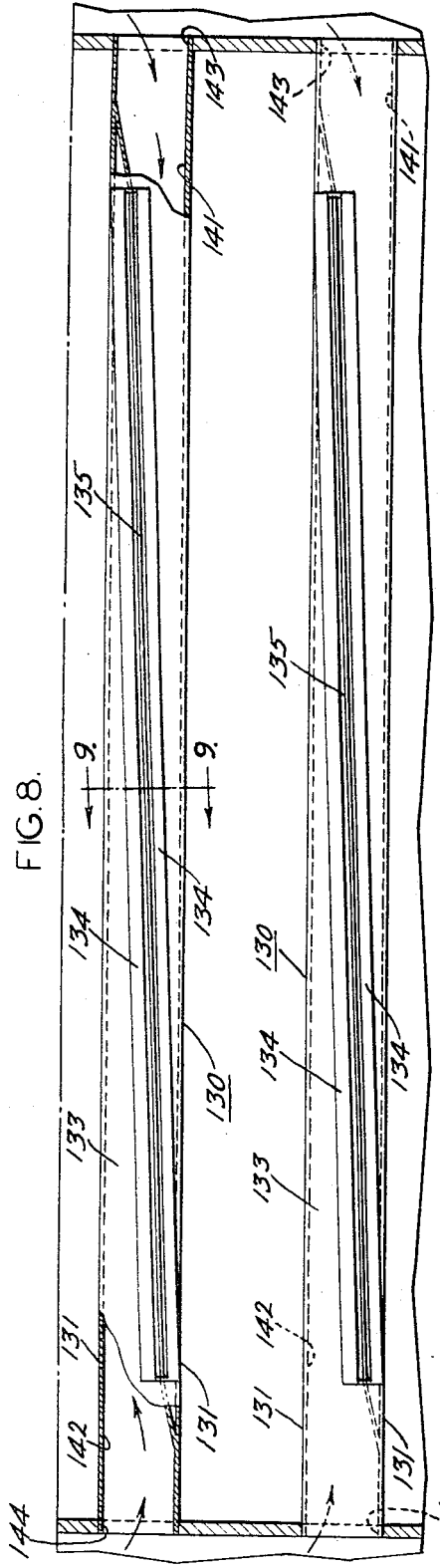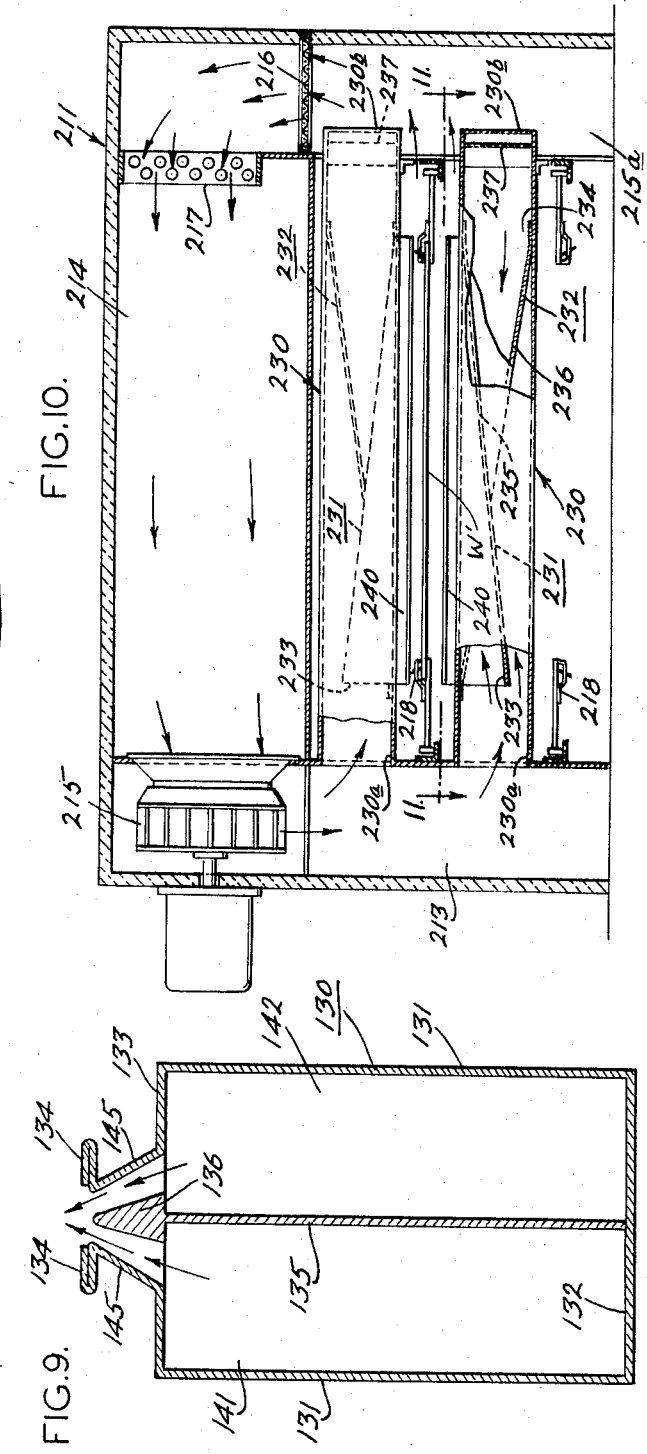

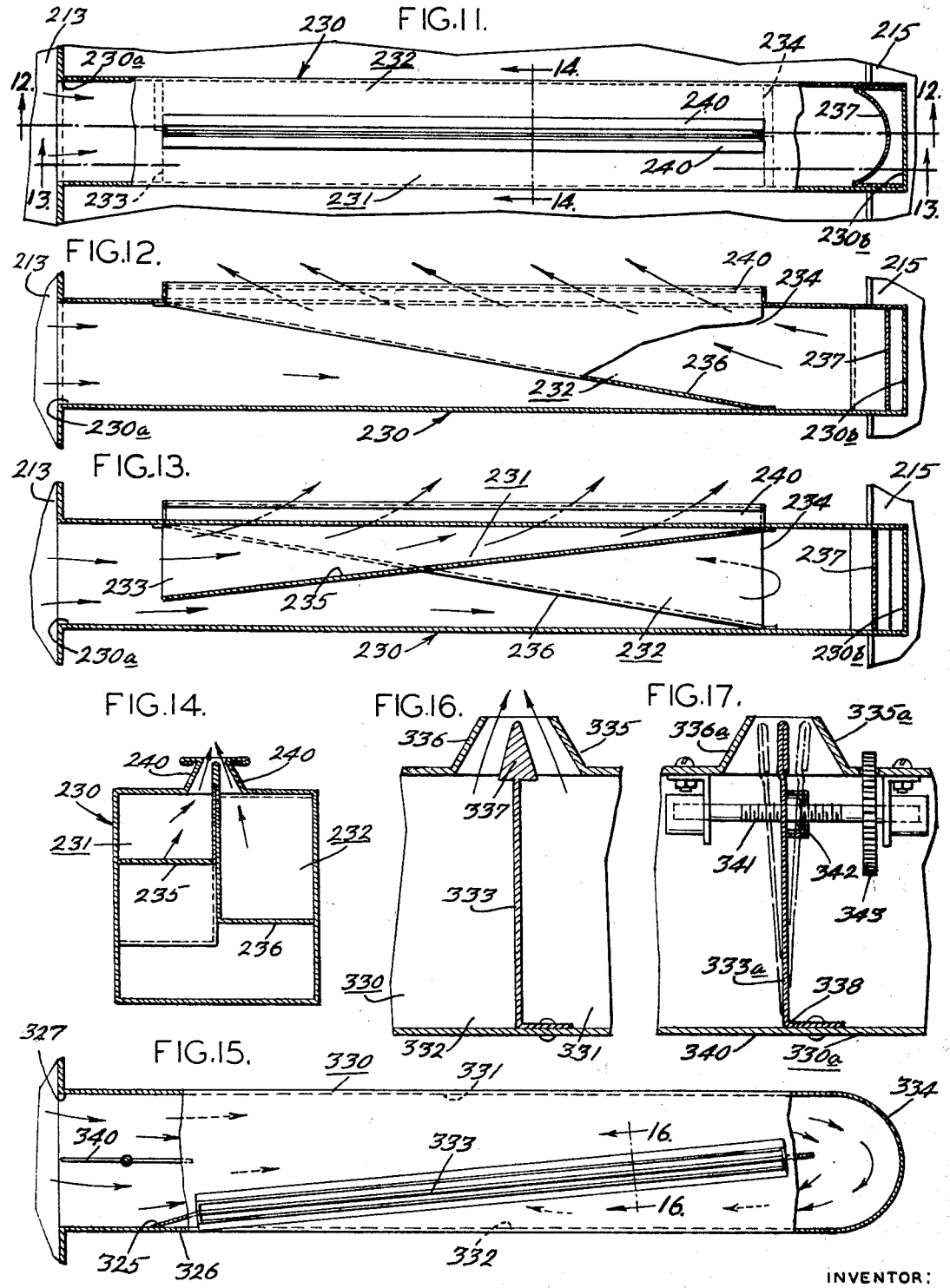

United States Patent Office 3,429,057
Patented Feb. 25, 1969

3,429,057
DRYERS
John R. Thygeson, Sr., Fox Chase Manor, Pa., assignor to Proctor & Schwartz, Inc., Philadelphia, Pa., a corporation of Pennsylvania
Filed Dec. 5, 1966, Ser. No. 599,294
U.S. Cl. 34—160    13 Claims
Int. Cl. F26b 3/04, 17/04, 13/02

ABSTRACT OF THE DISCLOSURE

The present invention relates to dryers having means for supplying gaseous drying medium to a web-like or granular material conveyed through the dryer, and more particularly to a novel nozzle arrangement for a dryer, which nozzle arrangement insures an even, unbroken stream of gaseous drying medium upon the material to be dried.

In the preferred embodiment of the invention, a dryer is provided having means for supporting and conveying a web-like or granular material therethrough. In one embodiment, interiorly of the dryer is at least a pair of pressure or blow boxes arranged above and below the path of travel of the web-like material, which boxes are positioned transversely of the web. Each of the blow boxes comprises a pair of ducts positioned adjacent one another, each including an air nozzle which projects outwardly from the duct towards the web-like material and which is inclined towards the nozzle projecting from the adjacent duct. The nozzles are spaced from the web so that the gaseous medium flowing from the one nozzle converges and merges with the gaseous medium flowing from the other nozzle forming a common stream at least at the path of travel of the web, and preferably before impingement of the gaseous medium upon the web.

State of the prior art

In conventional recirculating air dryers, the gaseous drying medium, usually air, is heated and then blown via a nozzle arrangement onto a traveling web of material which may be fabric, or sheet material, or loose fibers and composed of either a natural or synthetic material, or which may include a granular material such as cereal. When synthetic materials are used, it is important that the air flow on the web be unbroken, otherwise streaking or striping occurs on the web.

In many recirculating type dryers, uneven or broken air flow occurs at the nozzles, which condition may be traced to lint or fines accumulations at either the nozzles or at places in the air flow system having directional vanes or sharp breaks. Although filters may be used extensively in recirculating type dryers, the filters are incapable of removing very fine lint particles or fines which tend to build-up and cause accumulations at the areas of greatest change in the direction of flow in the pressurized recirculation system. Obviously this results in uneven air flow making the dryer less efficient overall, and in certain instances causing striping of the web and/or uneven drying when the accumulations occur at the nozzle openings.

Conventionally it has been the practice to provide deflectors or directional vanes interiorly of the nozzle structure to direct the air flow so that it strikes the web being dried substantially perpendicular thereto. Although striking the web with air currents substantially perpendicular thereto is desirable and necessary for proper drying of the material, the use of directional vanes is highly undesirable because of the aforementioned problem of lint or fines accumulation.

Description of the invention

In view of the above, it is a principal object of the present invention to provide a blow or pressure box with a novel nozzle construction requiring no directional vanes while permitting an unbroken, even stream of drying medium to impinge against the web or granular material being dried.

Another object of the present invention is to provide a novel nozzle construction of a design inherently tending to prevent lint and fines accumulation making the dryer suitable for both synthetics and natural fabric drying sheet material, and granular material.

Still another object of the present invention is to provide a novel nozzle design which, due to its construction, permits impingement of the air or drying medium egressing from the nozzles to merge into a common stream which impinges substantially perpendicularly against the web or granular material to be dried.

Another object of the present invention is to provide a novel nozzle and duct construction which permits convergence of the streams of gaseous medium egressing from the nozzles at an angle to each other to permit the drying medium to assume a swirling motion thereby encouraging a scrubbing action on the web or granular material being dried increasing the efficiency of the medium in evaporating moisture carried by the web or granular material.

Other objects and a fuller understanding of the invention may be had by referring to the following specification and claims taken in conjunction with the accompanying drawings in which:

FIG. 1 is a fragmentary, sectional side elevational view of a dryer utilizing a novel nozzle arrangement in accordance with the present invention;

FIG. 2 is an enlarged sectional view taken along line 2—2 of FIG. 1;

FIG. 3 is a fragmentary sectional view taken along line 3—3 of FIG. 2;

FIG. 8 is a fragmentary plan view of a modified blow box and nozzle arrangement constructed in accordance with the present invention, and similar to the view shown in FIG. 3;

FIG. 9 is an enlarged sectional view taken along line 9—9 of FIG. 8;

FIG. 10 is a fragmentary sectional view in side elevation of another dryer having a novel blow box and nozzle arrangement constructed in accordance with the present invention;

FIG. 11 is a sectional view taken along line 11—11 of FIG. 10;

FIG. 12 is a sectional view taken along line 12—12 of FIG. 11;

FIG. 13 is a sectional view taken along line 13—13 of FIG. 11;

FIG. 14 is a sectional view taken along line 14—14 of FIG. 11;

FIG. 15 is a fragmentary plan view of another embodiment of the present invention having means to vary the quantity of air entering discrete portions of the blow boxes;

FIG. 16 is an enlarged fragmentary sectional view taken along line 16—16 of FIG. 15;

FIG. 17 is a modification of the embodiment illustrated in FIG. 16 showing adjustment means for varying air flow in the novel nozzle;

Figure 4:
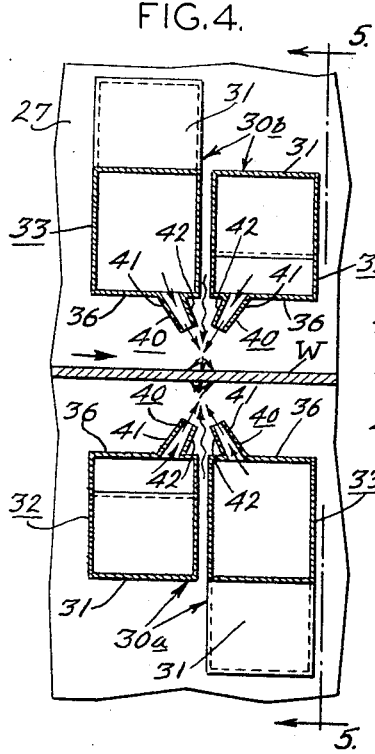
FIG. 4 is an enlarged fragmentary sectional view taken along line 4—4 of FIG. 2.

Referring now to the drawings, and especially to the embodiment of the invention illustrated in FIGS. 1-6, a dryer 10 comprises a generally rectangular housing 11 through which web material W is conveyed, in the present instance, by a tenter type conveyor 12. For purposes of the following description, it should be recognized that the web W may include sheet material, fabric, a bat of loose fibers, loose fibers and granular material. As shown in FIG. 1, the material enters an inlet end 13 of the housing 11 which is provided with an air lock 14 to minimize leakage, and egresses from the outlet end 15 of the housing through an outlet air lock 16.

As is customary with dryers of the recirculation type, air or other suitable gaseous drying medium is circulated through the housing 11 by a plurality of fans or blowers 20 driven in the present instance by separate motors 21 located externally of the housing 11. As best illustrated in FIG. 2, the blowers discharge into a first plenum chamber 22 which is in fluid communication with a second plenum chamber 23, in the present instance located at opposite longitudinal sides of the housing. As is conventional practice, intermediate the first and second plenum chambers are filter screens 24 and heaters 25 to clean the air and impart heat thereto in order to more efficiently dry the web W as it passes through the dryer 10. As shown, the first plenum chamber 22 is separated from a suction chamber 27 through which the web W passes, by a longitudinally extending bottom wall 26 through which suitable apertures 26a permit fluid communication between the suction side of the blower 20, and the suction chamber 27.

In accordance with the invention, at least a pair of blow or pressure boxes 30a and 30b, in the present instance a plurality of blow boxes 30, are arranged on opposite sides of the plane of travel of the web W and positioned transversely thereto, each containing means for receiving air from the plenum chambers 23 and emitting the air to opposite sides of the web to efficiently dry the web. To this end, each blow box comprises a pair of ducts 32 and 33 positioned adjacent one another and having air inlets 34 and 35 respectively in fluid communication with the plenum chambers 23 located along the opposite sides of the housing 11 so that gaseous medium enters each duct of the pair from opposite ends. As illustrated, each duct is tapered away from the wide inlet end towards its opposite closed narrow end, in the present instance the wall 31 being tapered away from the inlets towards the surface 36 of the ducts to provide for a more even flow distribution from a nozzle 40 located on the surface 36 for drying medium impingement against the web W.

Figure 5:
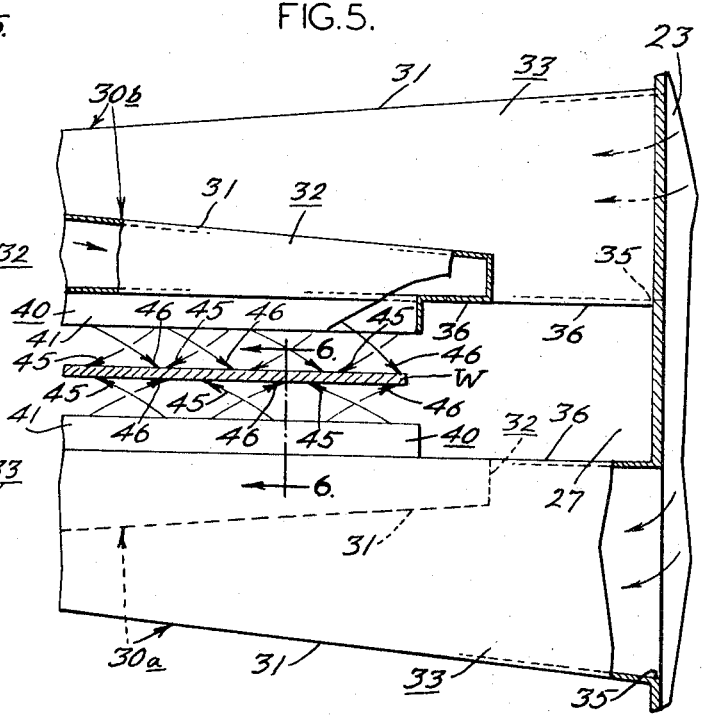
FIG. 5 is a sectional view taken along line 5—5 of FIG. 4.
Figure 6:
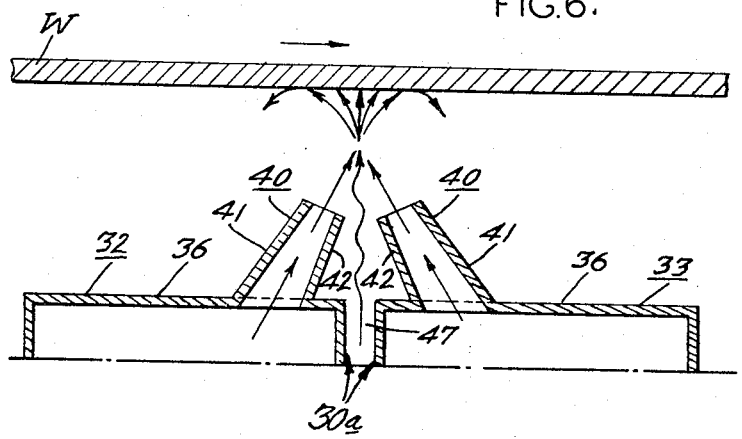
FIG. 6 is an enlarged fragmentary sectional view taken along line 6—6 of FIG. 5.

As shown best in FIGS. 4-6, each of the ducts 32 and 33 is provided with an outwardly projecting air nozzle 40 which extends transversely of the direction of travel of the web W, and in the present instance substantially the width of the web. As illustrated in FIGS. 4 and 6, each nozzle 40 includes a pair of projections 41 and 42 extending longitudinally of the ducts and in the present instance inwardly tapered so as to form a nozzle. As shown, the nozzles of the pair of ducts 32 and 33 are inclined towards one another and the web and spaced sufficiently distant from the web W so that the stream of medium flowing from the one nozzle converges, and merges with the stream of medium flowing from the other nozzle and forms a common stream at least at the plane of travel of the web preferably before impingement of the separate drying medium streams on the web.

As best shown in FIG. 6, drying medium from the nozzles 40, upon merging will cause a common stream of medium flow which impinges against the web along a line transverse to its direction of movement in a direction perpendicular to the plane of the web W. The perpendicular flow is particularly good for achieving uniformity of drying and maximum efficiency.

In addition to promoting the substantially perpendicular medium flow impinging upon opposite sides of the web. It has been discovered that by providing the nozzles with gaseous medium inlets at opposite ends to provide a stream of medium emitting from one nozzle having a longitudinal current opposite to the longitudinal current of the gaseous medium stream flowing from the other nozzle, a criss-cross medium flow occurs causing turbulence in the merged gaseous medium stream.

In this manner, a gentle agitation is effected at the point of impingement on the web causing a scrubbing action of the air against the material of which the web is composed thus promoting a highly efficient and rapid drying of the web material especially important when the web material is a fibrous material. The criss-cross effect is noted particularly in FIG. 5 wherein the arrows 45 indicate the longitudinal current of the medium egressing from the nozzle 40 associated with the ducts 33 while the arrows 46 illustrate the longitudinal current of the medium emitting from the nozzles 40 associated with the ducts 32.

Figure 7:
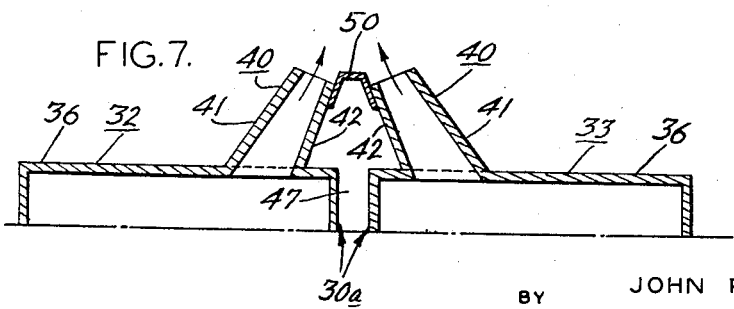
FIG. 7 is a view similar to FIG. 6 and illustrating a modified nozzle arrangement.

In certain instances where it is desirable to promote the mass movement of medium in order to effect drying very quickly, and where the material being dried is not capable of being subjected to high temperature medium, the ducts 32 and 33 may be spaced laterally apart one from the other so as to permit the venturi effect caused by the medium emitting from the converging inclined nozzles to create an updraft, or downdraft as the case may be promoting medium flow between the adjacent ducts. Of course, in instances where it is preferable to impinge only the treated medium against the web, it is a simple matter to add an adaptor 50 (see FIG. 7) intermediate the outlets of the adjacent nozzles, or in a position to effectively cover the space 47 intermediate the ducts 32 and 33.

In certain instances a less expensive blow box construction may be provided operable in the same manner as heretofore described. To this end, and as best shown in FIGS. 8 and 9, a blow box 130 may be constructed of a single sheet of sheet metal and braked so as to form side walls 131, bottom wall 132, and a top wall 133 having centrally and inwardly bent, outwardly projecting terminal portions 134 providing an outlet from the blow box. A partition 135 may be positioned diagonally interiorly of the blow box 130 dividing the box into separate ducts 141 and 142. As the partition is positioned diagonally (as appears in plan in FIG. 8), the ducts are tapered from their inlet toward their closed ends and an evenness in flow from the ducts is insured. As illustrated in FIG. 8, the medium enters the duct 142 from the left at an inlet end 144 and the medium enters the duct 141 from the right at an inlet end 143. In addition, the partition 135 includes an extension 136 which serves as a divider forming converging nozzles 145 on either side of the terminal ends of the extension 136.

It is also possible to modify certain conventional recirculating dryers in accordance with the present invention, and in addition, in circumstances where space requirements do not permit a wide lateral expanse, or require a different flow arrangement and the like, it is possible to construct a dryer utilizing the novel nozzle structure of the present invention with the entire medium flow entering the blow boxes from one end while still permitting the medium to flow into the ducts from opposite ends to obtain the desired opposite longitudinal currents. The dryer embodiment illustrated in FIGS. 10-14 is one such typical modified arrangement. To this end the dryer comprises a housing 211 having a plenum chamber 213 and a suction chamber 214 connected via a blower 215. In this embodiment, the exhausted gaseous media enters a second suction chamber 215a, passes through a filter screen 216 on the suction side of the blower and enters the first suction chamber 214 through a heater 217. As heretofore described, at least a pair of novel blow boxes 230 are positioned on opposite sides of a web W' which is to be dried and which is being conveyed by conveying means 218 (in the present instance a tenter) for permitting drying of the web W' by gaseous medium emitting from the blow boxes 230.

In order to achieve the criss-cross air stream effect with the resulting agitation of the web due to turbulence, as discussed with reference to FIG. 5, it is necessary to provide means to permit the ducts associated with the blow boxes 230 to have gaseous media inlets at opposite ends of the blow box despite the entry of the gaseous media into only one end of the blow box from the plenum chamber 213. To this end, the blow boxes 230 may comprise a pair of ducts 231 and 232 positioned adjacent one another, the duct 231 having a gaseous medium inlet 233 adjacent the inlet 230a of the blow box 230 from the plenum chamber 213. As illustrated in FIG. 13, the duct 231 has a lower wall 235 which tapers upwardly towards its upper surface for purposes which have heretofore been described. As noted, the inlet 233 associated with the duct 231 is designed to permit a quantity of gaseous medium to bypass the inlet 233 and flow towards the opposite end of the blow box 230. At the opposite terminal end 230b of the blow box is an arcuate deflector 237 which serves to redirect the gaseous flow into an inlet 234 associated with the duct 232. As with the wall 235, the lower wall 236 of the duct 232 is tapered upwardly to insure uniform flow of gaseous medium from the duct. In addition, as best seen in FIG. 14, each of the ducts 231 and 232 is provided with an air nozzle 240 which projects outwardly from it ducts, extending transversely of the web W', and which is inclined towards the nozzle projecting from the other duct. As heretofore described, the nozzles are spaced from the web so that the gaseous medium flowing from one nozzle converges and merges with the gaseous medium flowing from the other nozzle into a common stream at least at the plane of travel of the web W', and preferably prior to impingement of the separate streams of medium against the web, so that the common stream impinges against the web along a line.

In a less expensive construction, similar to that which has heretofore been described with reference to FIGS. 8 and 9, the dryer illustrated in FIGS. 10–14 may be modified with some inherent advantages. For example and referring to FIG. 15, a blow box 330 may include a pair of ducts 331 and 332 by fitting therein a diagonal partition 333 connected the medium inlet as at 325 to a wall 326 of the blow box and terminating at the opposite end spaced from the interior wall of the box. With this construction the air flow from the plenum chamber such as the plenum chamber 213 once again enters the blow box 330 from the same end, in the present instance at an inlet 327, the flow being split thereafter between the ducts 331 and 332. In addition, the deflector 237, above-described with reference to FIGS. 11–13, may be made an inherent and integral part of the blow box merely by curving the end 334 of the blow box opposite the gaseous medium inlet 327 so that it merges into the inlet of the duct 332. In this manner, the inlet gaseous medium from the inlet 327 of the blow box 330 enters the duct 331, the remainder of the flow being routed by the opposite end of the blow box (acting as a deflector) and entering the duct 332. As shown in FIG. 16, an extension 337 projects upwardly from the partition 333 to form converging nozzles 335 and 336 associated respectively with ducts 331 and 332.

In order to divide the flow of gaseous medium entering the inlet 327 of the blow box 330, it may be desirable to affix a variable damper interiorly of the inlet, such as the damper 340 illustrated in FIG. 15. In this manner, the medium flow into the duct 331 may be adjustably separated more effectively and equitably from the medium flow entering the duct 332.

In certain instances it may be desirable to vary the velocity and/or the angle of the stream of gaseous medium as it leaves or is emitted from the nozzles associated with the ducts. To this end, the partition 333 may be made variable so as to permit an increase or decrease in the size of the nozzle opening thus permitting a greater or lesser velocity of air to emit from one or the other nozzle. An embodiment illustrating such a variation is illustrated in FIG. 17 wherein the partition 333a is hingedly secured as at 338 to the bottom wall 340 of a blow box 330a. A screw 341 connected as by a nut 342 to the partition 333a will permit adjustment of the partition 333a by a handwheel 343 so as to vary the opening of nozzles 335a and 336a. Of course, means may be provided to individually vary the nozzle velocity and it is a simple matter for one skilled in the art to do this if such does become desirable in a particular configuration wherein a particular material, which is sensitive to flow velocity and/or flow angle, is to be dried.

Figure 18:
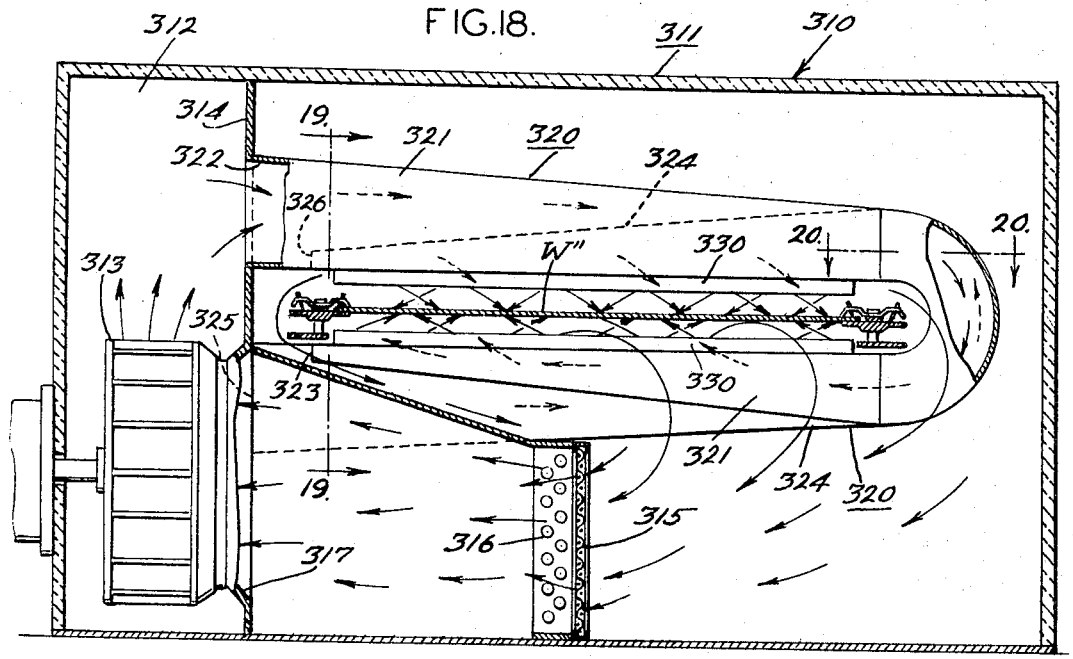
FIG. 18 is a fragmentary side elevational view of another embodiment of a dryer having a novel nozzle constructed in accordance with the present invention.
Figure 19:
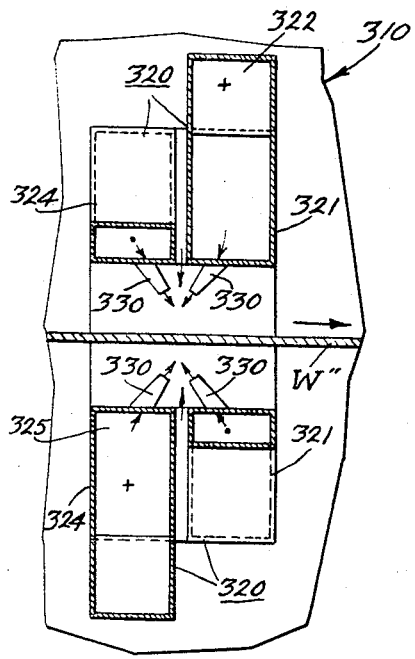
FIG. 19 is an enlarged fragmentary sectional view taken along line 19—19 of FIG. 18.
Figure 20:
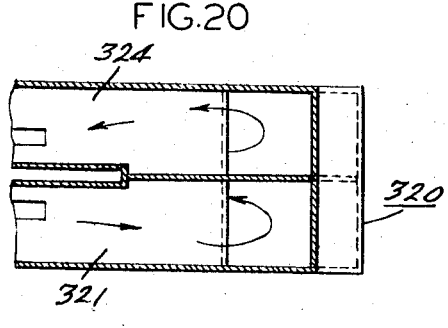
FIG. 20 is an enlarged fragmentary sectional view taken along line 20—20 of FIG. 18.

Other dryer configurations of course may be utilized accommodating the novel nozzle principle and construction set forth heretofore, for example where it is desirable that a plurality of large blowers be positioned along one longitudinal side of the dryer each serving to supply a plurality of pairs of interconnected blow boxes positioned transversely and consecutively longitudinally of the dryer, and on opposite sides of the web to be dried. Such an embodiment is illustrated in FIGS. 18–20 wherein a dryer 310, comprising a housing 311 and a longitudinally extending plenum chamber 312, houses a blower wheel 313 for supplying gaseous medium to blow boxes 320 operating in pairs and positioned on opposite sides of the web. As shown in FIG. 18, a longitudinally extending wall 314 separates the plenum chamber 312 from the area through which the web to be treated is positioned. the return drying medium progressing through a filter screen 315, a heater 316 and then into the inlet 317 of the blower 313. As illustrated in FIGS. 18–20, each of the blow boxes 320, as heretofore described, comprises a pair of ducts 321, 324 positioned adjacent one another and oriented transversely of a web W''. However, in the present instance the ducts associated with the blow boxes on the upper position of the web are connected to the ducts associated with the blow boxes on the lower portion of the web. For example, the blow box 320 in the upper portion of FIG. 18, includes a duct 321 having an inlet 322 communicative with the plenum chamber 312, the duct 321 extending to the right hand edge of the web W'' and curving around the right hand edge and tapering to a terminus 323 on the opposite side of the web W''. In a like manner a duct 324 having an inlet 325 in the plenum chamber 312, extends from the plenum chamber 312 and curves around the right hand edge of the web and tapers to a terminus 326 on the upper portion of the web W''. Thus the duct 324 associated with the lower blow box 320 is connected and forms the duct 324 associated with the upper blow box. In a like manner, the duct 321 associated with the upper blow box 320 is connected to and forms the duct 321 for the lower blow box 320.

As above-described, each of the ducts of the blow boxes includes a nozzle 330 projecting outwardly therefrom and substantially the width of the web while extending laterally thereof. The nozzles 330 of adjacent ducts of the blow box 320 are inclined or converge towards one another and are spaced from the web so that the stream of drying medium flowing from the one nozzle converges and merges with the drying medium flowing from the other nozzle into a common stream at least at the plane of travel of the web, and preferably adjacent thereto in order to form a wall of drying air substantially perpendicular to the web. Also, as may be noted from the above description, the drying medium enters the opposite ends of the adjacent ducts creating oppositely directed longitudinal currents providing a criss-cross flow of drying medium causing turbulence for effecting a gentle agitation of the web.

The apparatus hereinabove described is particularly useful when the web-like material is of a continuous nature. With a web of the continuous type, it is desirable to provide at least a pair of blow or pressure boxes on opposite sides of the plane of travel of the web and positioned transversely thereto. However in instances where the web is composed of a granular or loose material, it is desirable that the air or other gaseous medium being used to dry the material, be permitted to turn or tumble the granular or loose material to further effect economies and increase the efficiency of drying. To this end, a plurality of blow boxes may be provided on one side of the web of loose material and the material conveyed through the dryer by a foraminous conveyor. The advantages of the nozzle construction of the present invention in drying granular or lose material is that the jets of air emitting from the nozzles will be uniform across the width of the dryer as well as substantially perpendicular to the plane of the conveyor. In this manner the granular or loose material will be tumbled and redeposited relatively uniformly on the conveyor without ejection over the sides of the conveyor. Thus the direction of flow of the air from the nozzles results in maintaining a uniform depth and bed of material.

In the drying of granular or loose material it may be desirable to impinge air or gaseous drying medium upon the granular material from above the plane of the conveyor. This would be true, for example, where the material has reached a state of dryness where, while it is still practical to blow air from beneath the conveyor through the bed of loose material, means must be provided for deflecting and returning the loose material to the upper portion of the conveyor. Such means would include, and as is conventional, a hood or curved deflector overlying the conveyor, superimposed of the blow box, which acts to turn the material blown upwardly from the conveyor by the gaseous medium, downwardly onto the top of the conveyor.

It should be recognized that the apparatus of the present invention may also be utilized to wet web-like material by using a wet quality steam in place of the drying medium. It has been found that by utilizing wet steam in the apparatus of the present invention a more even and uniform wetting of the web will result.

Thus the present invention provides blower pressure boxes having a novel nozzle construction which requires no lint or fines accumulating directional vanes and permits an unbroken, even and substantially perpendicular flow of the medium against the web material being treated. In addition, the novel construction of the blow boxes while permitting convergence of the streams of gaseous medium egressing from the nozzles, causes them to merge at an angle to each other to thereby permit the drying medium to assume a swirling motion or turbulence encouraging scrubbing or agitation of the web being dried and increasing the efficiency of the medium in evaporating moisture carried by the web.

Thus although the invention has been described with a certain degree of particularity, it should be understood that the present disclosure is only exemplary of the invention, and that numerous changes in the details of construction, and the combination and arrangement of parts may be made without departing from the spirit and scope of the invention as hereinafter claimed.

What is claimed is:

1. In apparatus for treating with gaseous medium material conveyed therethrough in a conveying plane, a pair of elongated ducts extending transversely to the direction of conveyance in said plane and positioned adjacent to one another, means to supply gaseous medium to said ducts, an elongated nozzle in each of said ducts extending across said plane and adapted to project an elongated stream of gaseous medium outwardly from said duct toward said plane, said nozzles being inclined toward each other and spaced from the path of travel of said material to cause the elongated streams of said gaseous medium to converge and merge to create a turbulent common stream which impinges against the material in said conveying plane along a line, said ducts having gaseous medium inlets at opposite ends respectively of said nozzles, the elongated stream of gaseous medium flowing from each of said nozzles having a longitudinal current opposite to the longitudinal current of the gaseous medium stream flowing from the other nozzle, thereby creating a swirling motion in said common stream upon merger along said line.

2. Apparatus according to claim 1 wherein said ducts are spaced apart laterally, whereby said medium streams converge to create a venturi effect tending to cause gaseous medium to flow toward said common stream from the space between said ducts.

3. Apparatus according to claim 2 including an adapter means closing off said space between said adjacent ducts.

4. Apparatus according to claim 1 including a blow box enclosing said ducts, partition means extending diagonally in said blow box longitudinally thereof and dividing said blow box to form said ducts, said ducts being oppositely tapered with wide ends tapering toward narrow ends.

5. Apparatus according to claim 4 including a gaseous medium inlet at the wide end of each duct, each of said inlets connected to said means for supplying gaseous medium.

6. Apparatus according to claim 5 wherein said blow box has a blow box inlet at one end and a deflector for gaseous medium at the opposite end, and wherein said partition means permits a portion of the medium entering said box inlet to flow through said box and be deflected by the said deflector into the duct inlet at the opposite end.

7. Apparatus according to claim 6 including an adjustable damper at said blow box inlet.

8. Apparatus according to claim 1 including means to vary the nozzle opening of at least one of said nozzles.

9. Apparatus according to claim 1 wherein said ducts have a common longitudinal inner wall including an outwardly projecting extension positioned intermediate said inclined nozzles to form a part thereof.

10. Apparatus according to claim 9 wherein common wall is hingedly mounted and including means to vary the nozzle openings by lateral displacement of said wall.

11. In apparatus for treating with a gaseous treating medium material conveyed therethrough in a conveying plane a blow box disposed on one side of said plane, said blow box having a box inlet at one end and means to supply gaseous medium thereto, a longitudinal partition in said box forming in said box a pair of elongated ducts for the gaseous medium, said partition being disposed diagonally in said box, one of said ducts thereby tapering from one end of said box towards the other and the other of said ducts tapering from the other end of said box toward the one end, each of said ducts having a medium inlet at the wide end, means providing fluid communication between each of said duct inlets respectively and said box inlet, and nozzle means extending along the length of each duct to direct the gaseous medium outwardly toward the conveying plane, the longitudinal gaseous medium currents in said ducts being opposite to one another.

12. Apparatus according to claim 11 wherein the one duct having its narrow end adjacent the box inlet is closed at its narrow end, and the other duct having its narrow end remote from said inlet is open at its narrow end to the inlet of said first duct, said other duct having a larger cross section to provide a passage affording said fluid communication from said box inlet to the inlet of said one duct.

13. Apparatus according to claim 11 wherein the narrow ends of said ducts are closed and including bypass means in said box parallel to said ducts to proportion the flow of gaseous medium entering the box inlet between the two duct inlets.

References Cited

UNITED STATES PATENTS

| | | | |
|---|---|---|---|
| 1,037,254 | 9/1912 | Hopkins | 34—160 XR |
| 2,152,238 | 3/1939 | Bridges | 34—159 |
| 2,732,631 | 1/1956 | Black | 34—242 XR |
| 3,134,654 | 5/1964 | Russell | 34—160 |
| 3,181,250 | 5/1965 | Vits | 34—160 XR |
| 3,235,931 | 2/1966 | Bruckner | 34—158 XR |
| 3,319,354 | 5/1967 | Hering et al. | 34—160 XR |

FOREIGN PATENTS

| | | |
|---|---|---|
| 1,149,169 | 7/1957 | France. |
| 1,145,572 | | Germany. |

FREDERICK L. MATTESON, JR., *Primary Examiner.*

H. B. RAMEY, *Assistant Examiner.*

U.S. Cl. X.R.

239—568

UNITED STATES PATENT OFFICE
CERTIFICATE OF CORRECTION

Patent No. 3,429,057 February 25, 1969

John R. Thygeson, Sr.

It is certified that error appears in the above identified patent and that said Letters Patent are hereby corrected as shown below:

Column 4, line 12, "web. It" should read -- web, it --. Column 5, line 68, after "end" insert -- 334 --.

Signed and sealed this 7th day of April 1970.

(SEAL)
Attest:

Edward M. Fletcher, Jr.
Attesting Officer

WILLIAM E. SCHUYLER, JR.
Commissioner of Patents